United States Patent [19]
Sarangapani et al.

[11] Patent Number: 6,064,926
[45] Date of Patent: May 16, 2000

[54] METHOD AND APPARATUS FOR DETERMINING AN ALTERNATE PATH IN RESPONSE TO DETECTION OF AN OBSTACLE

[75] Inventors: Jagannathan Sarangapani, Peoria; Carl A. Kemner, Peoria Heights, both of Ill.

[73] Assignee: Caterpillar Inc., Peoria, Ill.

[21] Appl. No.: 08/987,007

[22] Filed: Dec. 8, 1997

[51] Int. Cl.[7] .................................................. G06F 17/00
[52] U.S. Cl. ............................................. 701/26; 701/210
[58] Field of Search ................................ 701/24, 25, 26, 701/23, 209, 210; 342/455

[56] References Cited

U.S. PATENT DOCUMENTS

| | | | |
|---|---|---|---|
| 4,986,384 | 1/1991 | Okamoto et al. | 180/167 |
| 5,111,401 | 5/1992 | Everett, Jr. | 364/424 |
| 5,170,352 | 12/1992 | McTamaney et al. | 364/424.02 |
| 5,179,329 | 1/1993 | Nishikawa et al. | 318/587 |
| 5,515,286 | 5/1996 | Simon | 364/461 |
| 5,566,288 | 10/1996 | Koerhsen | 395/142 |
| 5,570,285 | 10/1996 | Asaka et al. | 364/424.02 |
| 5,587,929 | 12/1996 | League et al. | 364/516 |
| 5,612,116 | 3/1997 | Gudat et al. | 364/423 |
| 5,612,883 | 3/1997 | Shaffer et al. | 364/460 |
| 5,680,313 | 10/1997 | Whittaker et al. | 364/460 |

OTHER PUBLICATIONS

Ser. No. 08/432,389 filed May 1, 1995 Inventor: Whittaker, et al.
Ser. No. 08/536,761 filed Sep. 29, 1995 Method and Apparatus for Determining a Path for a Machine Between a Predetermined Route and a final position.

*Primary Examiner*—Gregory C. Issing
*Attorney, Agent, or Firm*—Steven D. Lundquist

[57] ABSTRACT

The present invention is a method and apparatus for planning an alternate path in response to detection of an obstacle by a mobile machine at a work site. The work site includes a fleet of mobile machines and a fleet manager. The method includes the steps of determining the presence and location of an obstacle in a primary path of the mobile machine, determining an alternate path around the obstacle, and delivering a signal to the fleet manager with the location of the obstacle and the alternate path.

21 Claims, 8 Drawing Sheets

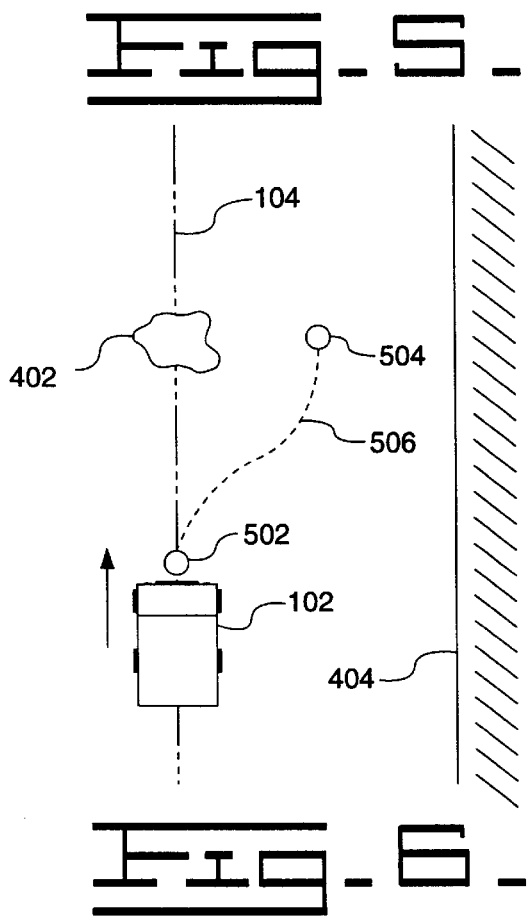
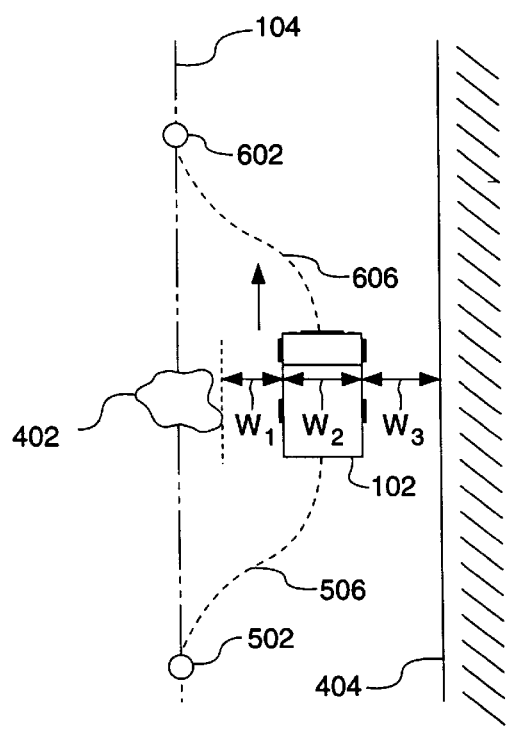

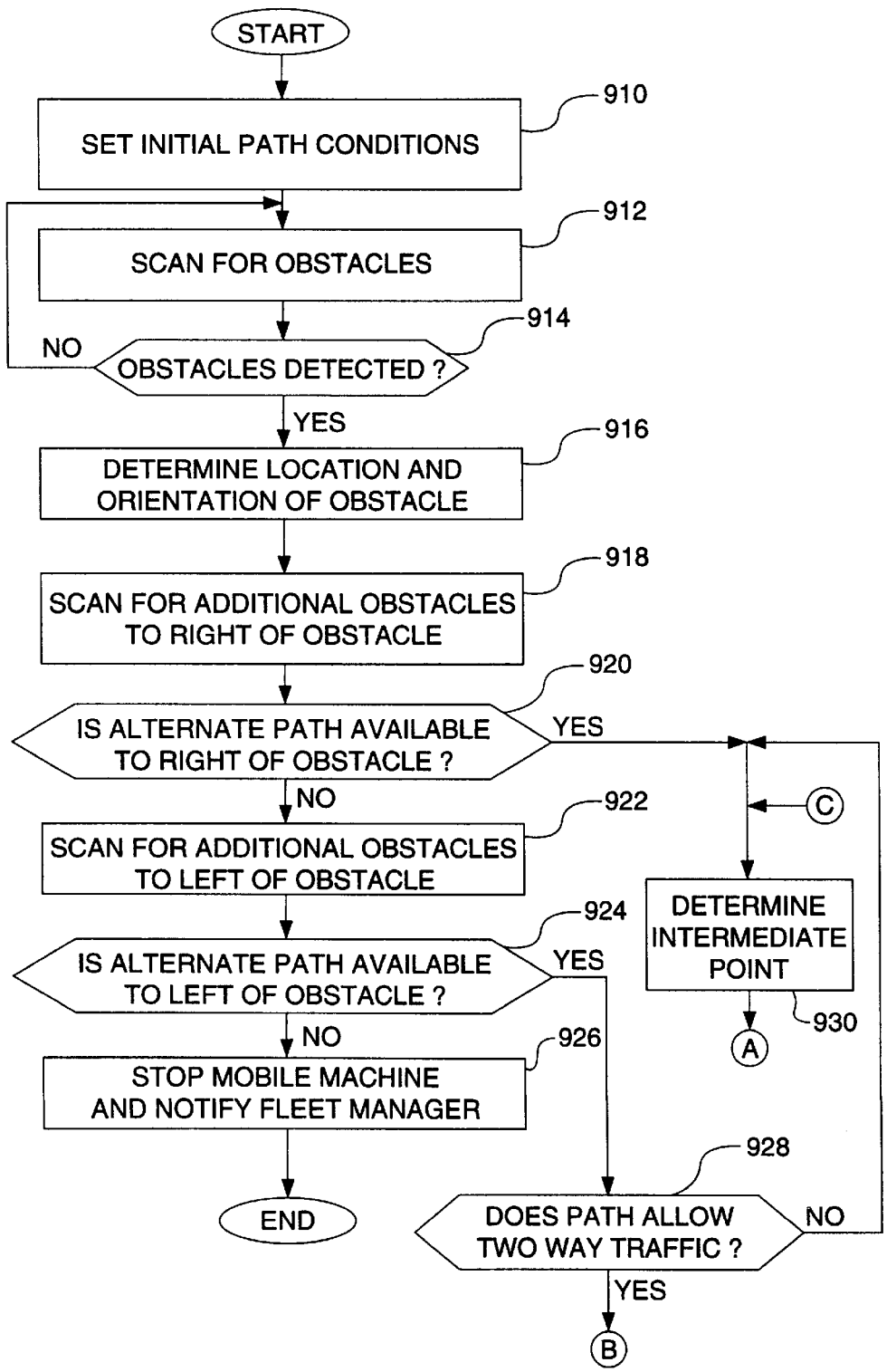

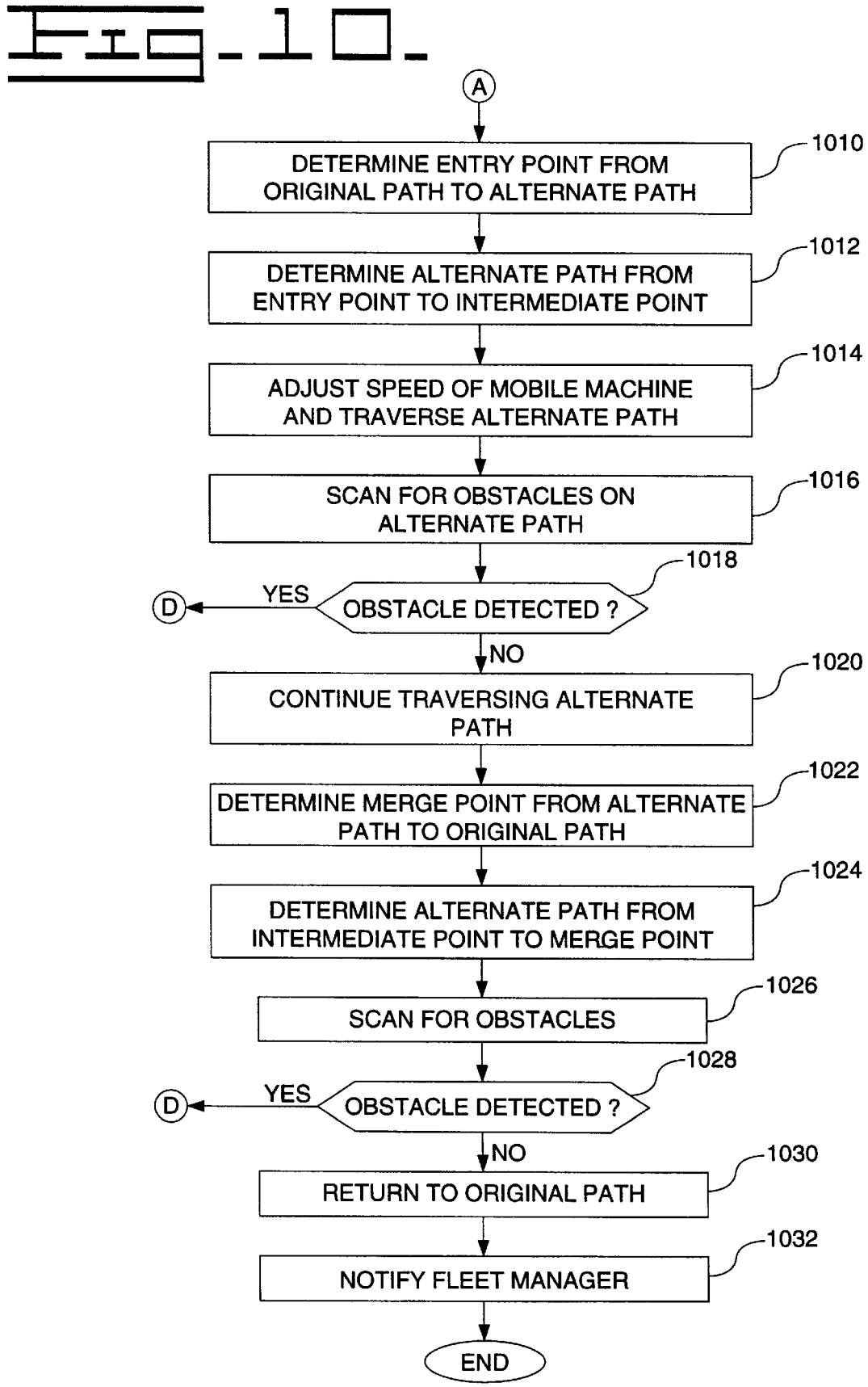

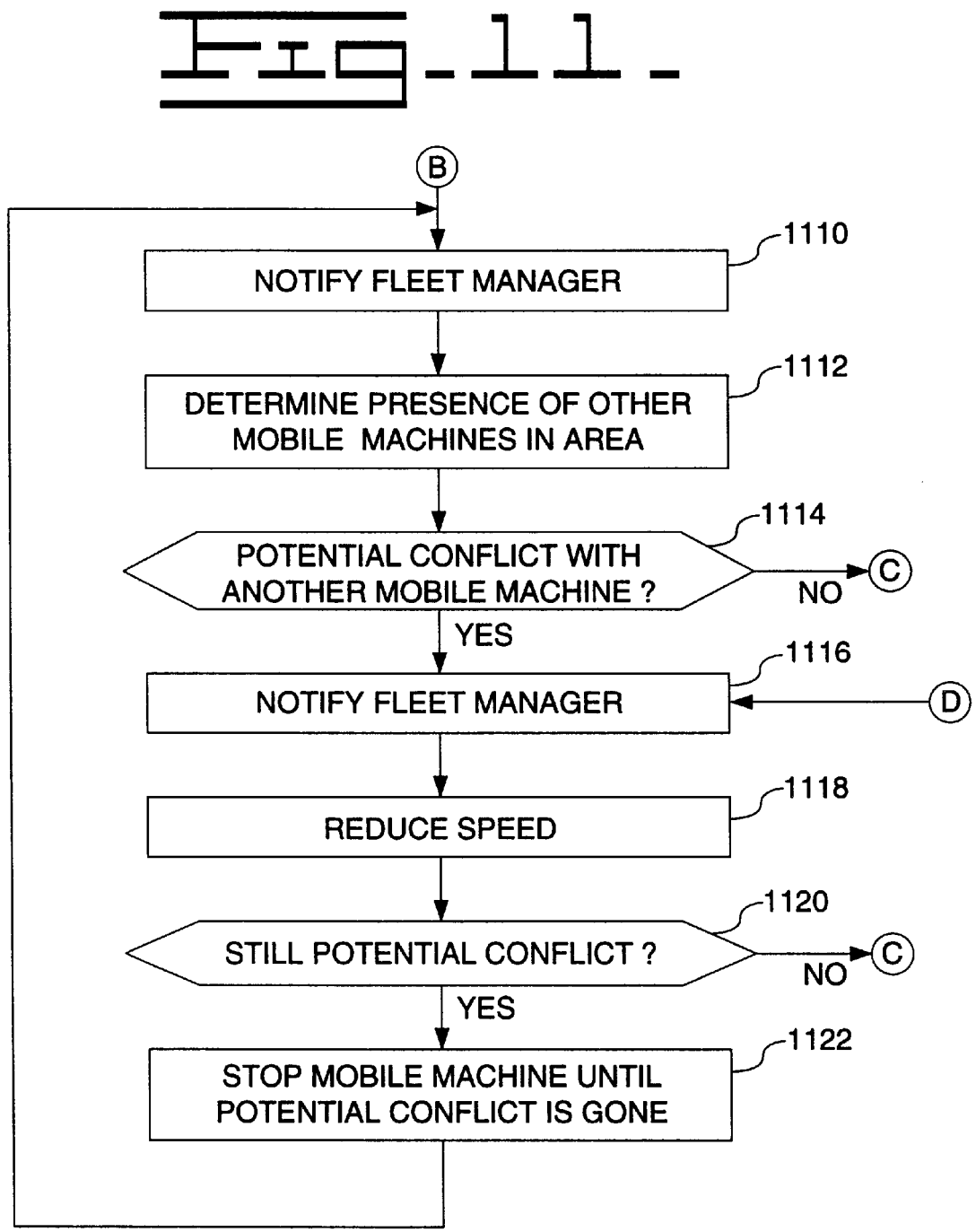

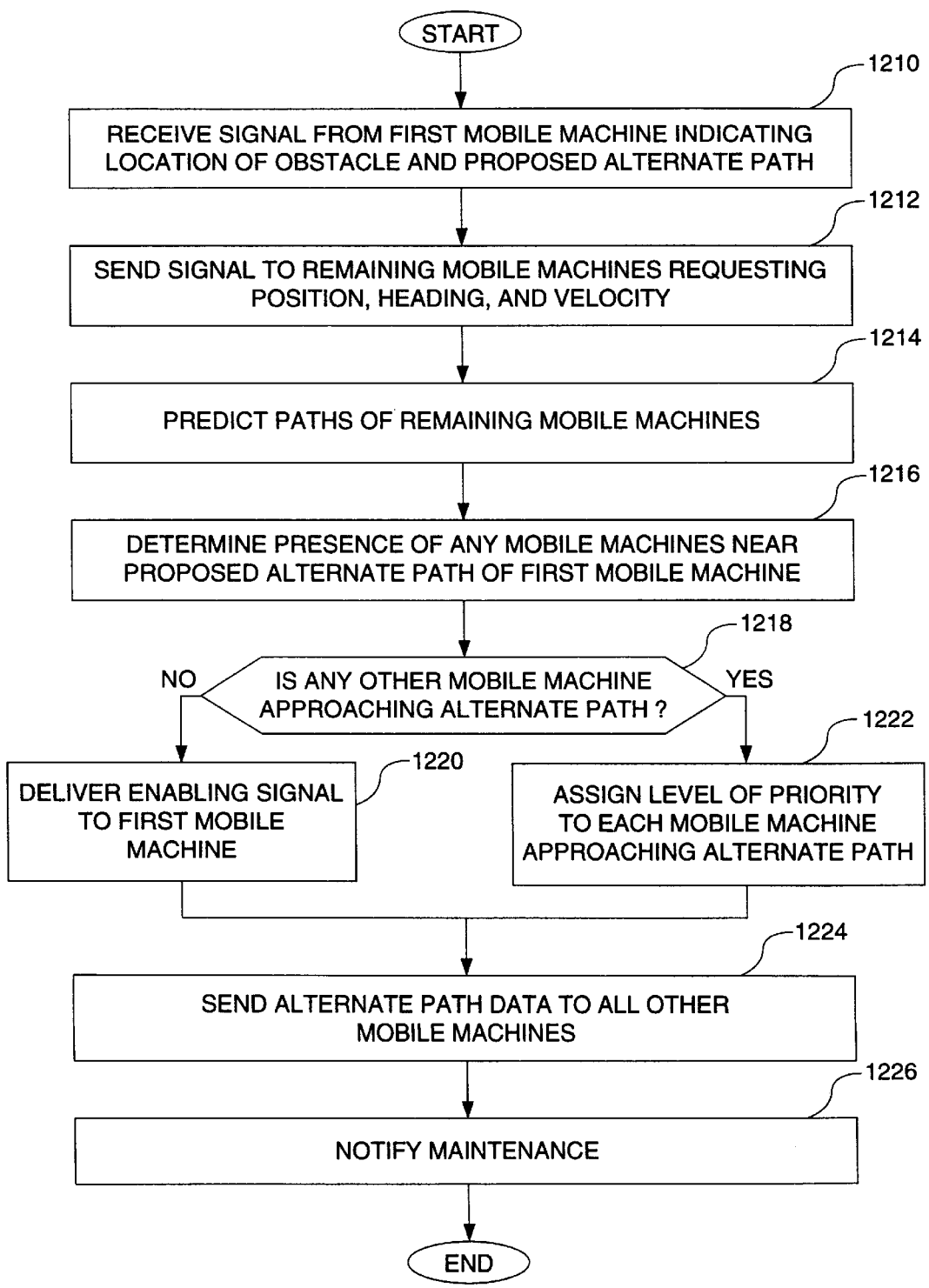

METHOD AND APPARATUS FOR DETERMINING AN ALTERNATE PATH IN RESPONSE TO DETECTION OF AN OBSTACLE

TECHNICAL FIELD

This invention relates generally to a method and apparatus for avoiding an obstacle in the path of a mobile machine and, more particularly, to a method and apparatus for determining an alternate path for the mobile machine in response to the detection of an obstacle.

BACKGROUND ART

Mobile machines are used to perform a variety of tasks. As an example, in an earthworking environment such as a mining site, mobile machines, e.g., off-road mining trucks, haul material throughout the site.

For repetitive tasks such as above, it is becoming advantageous and desirable to operate the mobile machines autonomously. The environment in which the trucks operate may be harsh, and more efficient operations may be attained if the human fatigue factor is eliminated.

As an example of using off-road mining trucks autonomously, U.S. Pat. No. 5,615,116, issued to Gudat et al., provides an exemplary disclosure of a system for autonomous operations of mobile machines. In this patent, Gudat et al. discloses a fleet of off-road mining trucks operating autonomously at a mining site. Parameters such as position determination, navigation, path planning, and machine control are performed without the aid of human operators.

An important factor in enabling a mobile machine to operate autonomously is the ability to detect obstacles in the machine's path of travel, and to respond in an acceptable manner when obstacles are detected. For example, U.S. Pat. No. 5,612,883, issued to Shaffer et al. teaches a system and method for detecting obstacles in the path of a mobile machine. However, Shaffer et al. does not disclose any method for planning a path around an obstacle when an obstacle is detected. The normal course of action when encountering an obstacle is to stop the mobile machine and notify a fleet manager to remove the obstacle.

In U.S. Pat. No. 5,570,285, Asaka et al. discloses a method and apparatus for planning a route around an obstacle when one is detected. However, in an environment where several mobile machines travel the same paths, each mobile machine that encounters an obstacle must respond individually. More efficient operations would be gained by sharing the information of a first mobile machine to travel around an obstacle with the remainder of the mobile machines.

The present invention is directed to overcoming one or more of the problems as set forth above.

DISCLOSURE OF THE INVENTION

In one aspect of the present invention a method for planning an alternate path in response to detection of an obstacle by a mobile machine at a work site is disclosed. The method includes the steps of determining the presence and location of the obstacle, determining an alternate path around the obstacle, and delivering a signal to a fleet manager with the location of the obstacle and the alternate path.

In another aspect of the present invention an apparatus for planning an alternate path in response to detection of an obstacle by a mobile machine at a work site is disclosed. The apparatus includes an obstacle detection system, a position determining system, a path planner, a communications system, and a control system to receive signals from the obstacle detection system, the position determining system, the path planner, and the communications system, and deliver a signal to a fleet manager with the location of the obstacle and the alternate path.

In yet another aspect of the present invention a method for controlling a fleet of mobile machines is disclosed. The method includes the steps of receiving a signal from a first mobile machine indicating the location of an obstacle and a proposed alternate path, determining the presence of any other mobile machine approaching the alternate path, and delivering a signal to the first mobile machine to enable the mobile machine to traverse the alternate path.

BRIEF DESCRIPTION OF THE DRAWINGS

FIG. 5 is a diagrammatic illustration of a mobile machine planning an initial alternate path around an obstacle;

FIG. 6 is a diagrammatic illustration of a mobile machine traveling around an obstacle;

FIG. 9 is a flow diagram further illustrating a mobile machine planning an alternate path around an obstacle;

FIG. 10 is a flow diagram illustrating a mobile machine traversing an alternate path around an obstacle;

FIG. 11 is a flow diagram illustrating multiple mobile machines traversing an alternate path around an obstacle; and FIG. 12 is a flow diagram illustrating a fleet manager controlling multiple mobile machines to traverse an alternate path around an obstacle.

BEST MODE FOR CARRYING OUT THE INVENTION

The present invention is a method and apparatus for planning an alternate path in response to detection of an obstacle by a mobile machine at a work site, the work site including a plurality of mobile machines and a fleet manager.

The present invention is described below with reference to a fleet of mobile machines at an earthworking site, such as an open pit mining site. However, other work sites, e.g., a warehouse, a logging site, a construction site, and the like, may benefit from application of the present invention.

Figure 1:
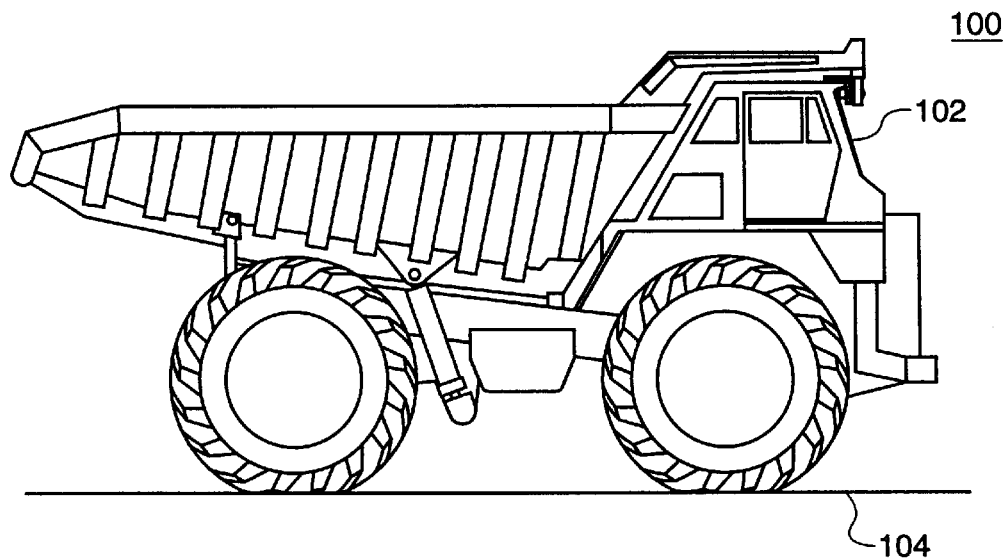
FIG. 1 is a diagrammatic illustration of a mobile machine shown as an off-road mining truck.

Referring to the drawings and, in particular, to FIG. 1, a mobile machine 102 is shown. The mobile machine 102 of FIG. 1 is depicted as an off-road mining truck, which travels on a path 104 at a mining site. Fleets of off-road mining trucks are used extensively at open pit mining sites to haul materials throughout the site. Recent developments in technology allow fleets of mining trucks to operate autonomously, thus freeing human operators from working long shifts in harsh environments.

A major concern in operating mobile machines autonomously is the ability to detect obstacles in the path of the mobile machine 102, and to plan an alternate path around the obstacle. Examples of obstacles include rocks and boulders, and other mobile machines that traverse the same path.

Although the mobile machine 102 in FIG. 1 is shown as an off-road mining truck, other types of mobile machines may use the present invention. Examples of mobile machines include fork lift trucks, logging trucks, wheel loaders, track-type tractors, and the like.

Figure 2:
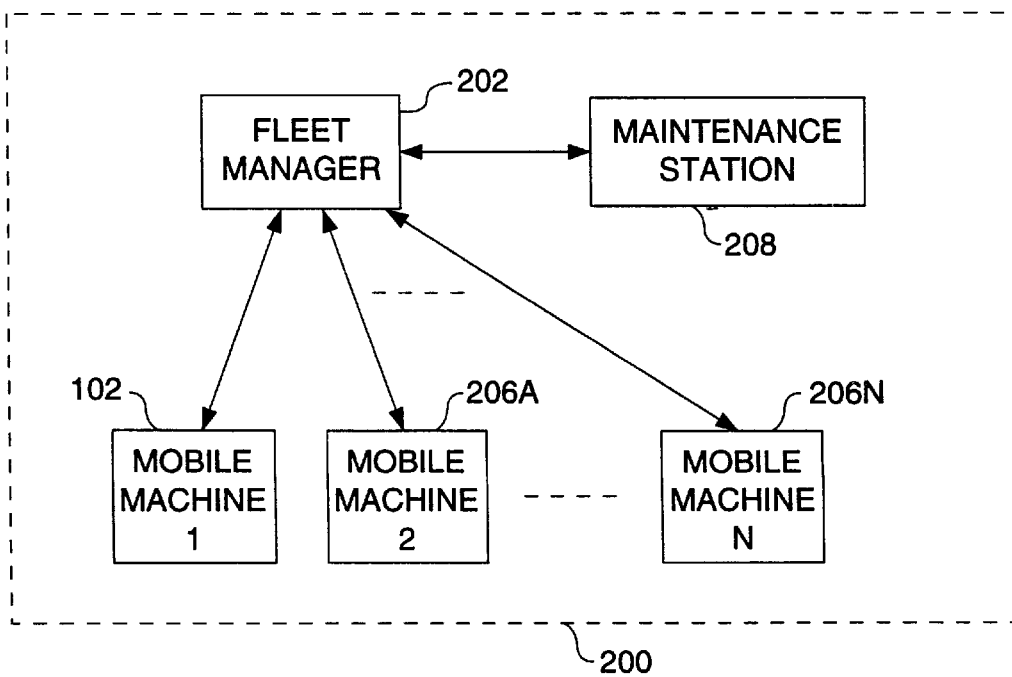
FIG. 2 is a block diagram illustrating a fleet of mobile machines at a work site.

Referring to FIG. 2, a block diagram of a work site 200 is shown. The work site includes a fleet manager 202, a maintenance station 208, and a plurality of mobile machines 102, 206A–206N. The fleet manager is equipped to receive signals from the maintenance station 208, and the mobile machines 102, 206A–206N. The fleet manager is also equipped to send signals to the maintenance station 208, and the mobile machines 102, 206A–206N. The fleet manager 202 is designed to monitor and control operations at the work site 200, and may function either autonomously or by human operators.

The maintenance station 208 receives instructions from the fleet manager 202. The primary purpose of the maintenance station 208 in the present invention is to clear the paths in the work site 200 of detected obstacles upon notification by the fleet manager 202.

Figure 3:
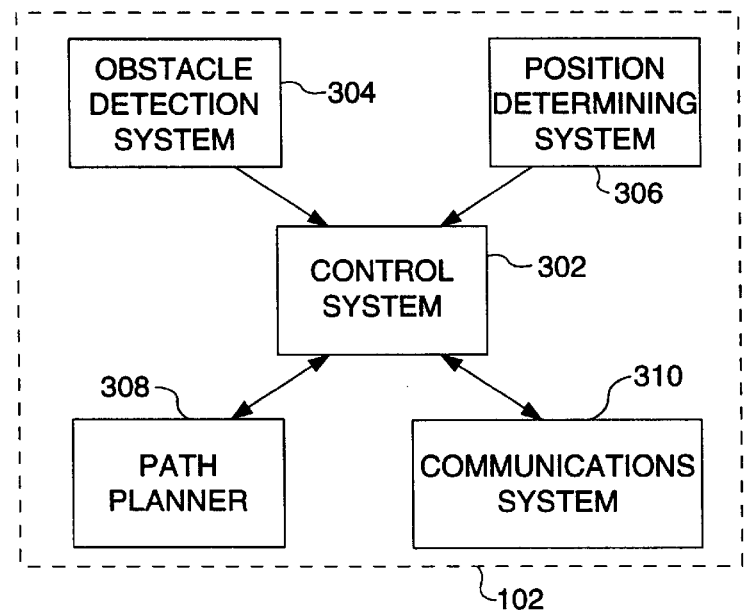
FIG. 3 is a block diagram of an autonomous system on a mobile machine.

Referring to FIG. 3, a block diagram is shown of a set of modules located on the mobile machine 102.

An obstacle detection system 304 detects obstacles in the path of the mobile machine 102. The obstacle detection system 304 includes at least one sensor (not shown) for detecting obstacles. Examples of obstacle detection sensors include radar sensors, laser sensors, ultrasonic sensors, infrared sensors, and optical sensors such as video cameras. The obstacle detection system 304 may include any combination of the above sensors or other types of sensors.

A position determining system 306 determines the location of the mobile machine 102 at the work site 200. The position determining system 306 may be a satellite positioning system, such as a global positioning satellite system (GPS), or a laser positioning system. The position determining system 306 may also be a version of an inertial positioning system, such as a dead reckoning system. Sensors, such as odometers and heading sensors, may be combined to form an inertial positioning system. In addition, the position determining system 306 may comprise a combination of positioning systems, such as GPS and dead reckoning.

Signals generated by the obstacle detection system 304 and the position determining system 306 are delivered to a control system 302. The control system 302 is configured to determine the presence and location of a detected obstacle from the data contained in these signals. The control system 302 also controls the movement of the mobile machine 102.

A path planner 308 receives a signal from the control system 302 indicating the presence and location of the obstacle, and responsively plans a proposed alternate path around the obstacle. A detailed explanation of path planning around an obstacle is given below.

A communications system 310 located on the mobile machine 102 receives data from the control system 302, and responsively delivers the data to the fleet manager 202 by way of communication techniques that are well known in the art. The communications system 310 also receives signals from the fleet manager 202, and delivers data from the signals to the control system 302. Alternatively, the communications system 310 may enable direct communications between mobile machines 102, 206A–206N.

Figure 4:
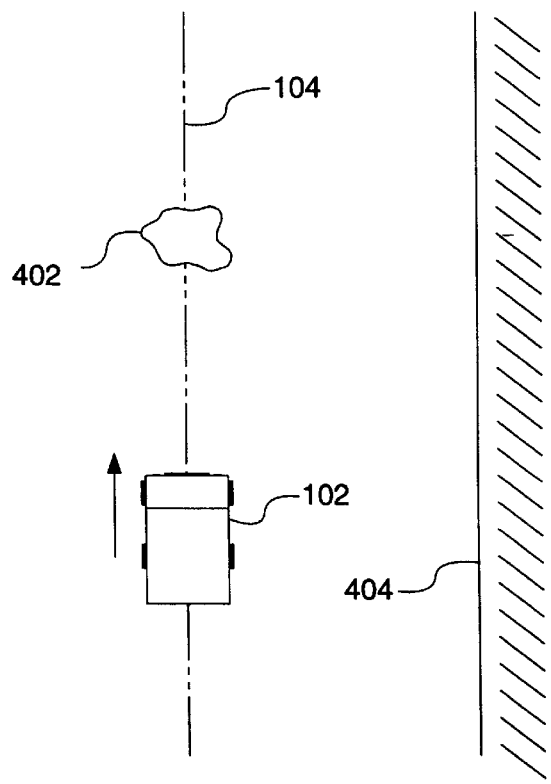
FIG. 4 is a diagrammatic illustration of a mobile machine approaching an obstacle on a path.

With reference to FIGS. 4–7, a general description of an application of the present invention is shown. In FIG. 4, a mobile machine 102 traveling on a path 104 is shown approaching an obstacle 402 on the path 104. The path 104 has a boundary 404 on each side of the mobile machine 102. The boundary 404 may be a guardrail, a cliff wall, a ravine, or the side of a road. In FIGS. 4–7 only the boundary 404 to the right of the mobile machine 102 is shown. However, it is understood that the path 104 has boundaries on both sides, which may or may not be of the same configuration. For example, the boundary 404 on the right may be a guardrail and a ravine, and the boundary 404 on the left may be a cliff wall.

Referring to FIG. 5, The mobile machine 102 begins to plan a path around the obstacle 402. In the general discussion of FIGS. 4–7 it is assumed that no additional obstacles exist in the planned path, and that no other mobile machines 206A–206N are near the planned path. However, in a more detailed discussion of the path planning method given below, conditions such as additional obstacles and other mobile machines 206A–206N will be considered.

An entry point 502 to an alternate path 506 and an intermediate point on the alternate path 506 are chosen. The entry point 502 is the location where the mobile machine 102 will leave the original path 104. The intermediate point 504 is a point about midway around the obstacle 402. A first segment 506 of an alternate path is planned from the entry point 502 to the intermediate point 504. The mobile machine 102 then proceeds to move around the obstacle 402 on the alternate path 506.

In FIG. 6, the mobile machine 102 is shown at the intermediate point 504. The path has been planned to allow the mobile machine 102 to be at the intermediate point at an orientation approximately parallel to the original path 104.

During the path planning process, the alternate path must be planned to be wide enough to allow for the width ($w_2$) of the mobile machine 102 and to allow for buffer zones to the left ($w_1$) of the mobile machine 102 and to the right ($w_3$) of the mobile machine 102. The buffer zone ($w_1$) is a predetermined minimum distance from the obstacle 402 to the left side of the mobile machine 102. The buffer zone ($w_3$) is a predetermined minimum distance from the right side of the mobile machine to the boundary 404 of the path 104. Therefore, the alternate path must be planned to be at least as wide as $w_1+w_2+w_3$. If the alternate path is to the left of the obstacle 402, the buffer zones ($w_1,w_3$) would be interchanged.

As the mobile machine 102 approaches the intermediate point 504, a merge point 602 is chosen. The merge point 602 is a point where the alternate path rejoins the original path 104 at a location that allows the mobile machine 102 to clear the obstacle 402. A second segment 606 of the alternate path is planned, and the mobile machine 102 proceeds to travel on this segment 606.

Figure 7:
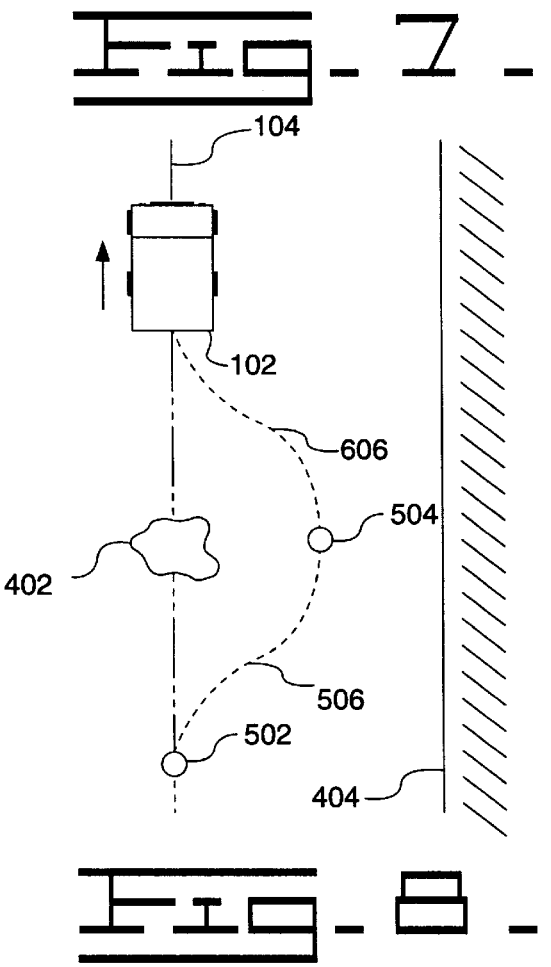
FIG. 7 is a diagrammatic illustration of a mobile machine completing an alternate path around an obstacle.

In FIG. 7, the mobile machine 102 is shown at the merge point 602, where the mobile machine 102 has returned to the original path 104. The alternate path 506,606 may then be used by other mobile machines 206A–206N as they approach the obstacle 402 in the path 104 until the obstacle 402 has been removed.

As an example of a method for planning a path, in U.S. patent application Ser. No. 08/536,761, now U.S. Pat. No. 5,752,207 Sarangapani discloses a smooth path planner for determining a path with nonholonomic constraints. Another example of a method for determining a path is disclosed in U.S. Pat. No. 5,566,288, where Koehrsen teaches a method to fit a b-spline curve to a set of data points. The curve can then be fitted with line segments to complete the path. Other methods to plan the alternate path 506,606 can be used without deviating from the spirit of the present invention.

With reference to FIGS. 8–12, flow diagrams showing detailed operation of the present invention are disclosed.

Figure 8:
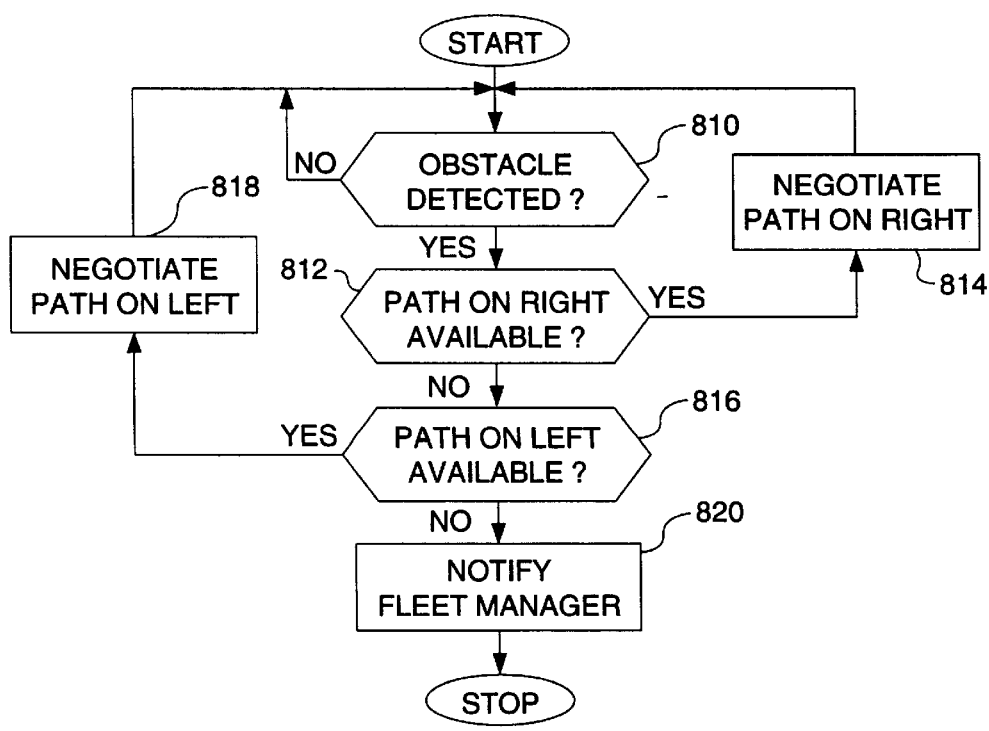
FIG. 8 is a flow diagram illustrating an aspect of a mobile machine planning an alternate path around an obstacle.

Referring to FIG. 8 in particular, a flow diagram illustrating one aspect of the present invention is shown. In a first decision block 810, the obstacle detection system 304 located on the mobile machine 102 scans for obstacles. If no obstacles are detected, the system continues scanning as the mobile machine 102 travels.

If an obstacle is detected, control proceeds to a second decision block 812, where the path planner 308 determines if a potential alternate path is available to the right of the obstacle. The choice of planning a path on the right of the obstacle is arbitrary. However, for exemplary purposes, the first choice of an alternate path is considered to the right assuming that, if the path supports two way traffic, oncoming traffic will be traveling to the left as viewed from the mobile machine 102. Under these conditions, an alternate path planned to the right will avoid conflicts with oncoming traffic. It is understood, however, that in a situation where traffic passes on the right, e.g., some foreign countries, it may be advantageous to first attempt to plan an alternate path on the left.

If a path to the right of the obstacle is available, then control proceeds to a first control block 814, where the mobile machine 102 travels around the obstacle on the right. The system then scans for more obstacles.

If a path to the right is not available, then the path planner 308 determines in a third decision block 816 if a potential alternate path exists to the left of the obstacle. If an alternate path can be planned to the left, then control proceeds to a second control block 818, where the mobile machine 102 travels around the obstacle on the left.

If no path on the left is available, control moves to a third control block 820, where the mobile machine 102 notifies the fleet manager 202. The mobile machine 102 then stops moving and waits for the obstacle to be removed.

Referring now to FIG. 9, a more detailed flow diagram illustrating an aspect of the present invention is shown.

In a first control block 910, initial path conditions are set. The initial conditions include predetermined minimum distances from each side of the mobile machine 102 to an obstacle. The predetermined minimum distances define a buffer zone on both sides of the mobile machine 102. The initial conditions also include information about the path being traveled on, such as one way or two way traffic patterns, etc.

In a second control block 912, the system scans for obstacles. A first decision block 914 determines if an obstacle is detected. If no obstacle is detected, the system continues to scan as the mobile machine 102 travels. If an obstacle is detected, control proceeds to a third control block 916, where the location and orientation of the obstacle is determined.

In the exemplary flow diagram of FIG. 9, it is assumed that the system will attempt to plan an alternate path to the right of the obstacle. Therefore, in a fourth control block 918, the system scans for additional obstacles to the right of the detected obstacle to determine if a path can be planned to the right.

In a second decision block 920, it is determined if an alternate path to the right is available based on the results of scanning for additional obstacles. If an alternate path is available to the right, control proceeds to a fifth control block 930, where an intermediate point on the alternate path is determined. Control then proceeds to FIG. 10, which is discussed below.

If no alternate path is available to the right, then control moves to a sixth control block 922, where the system scans for additional obstacles to the left of the detected obstacle. In a third decision block 924, the results of the scan to the left are used to determine if an alternate path exists to the left of the obstacle. If an alternate path to the left exists, then control proceeds to a fourth decision block 928.

In the fourth decision block 928, it is determined if the path allows two way traffic. If the path allows two way traffic, then control proceeds to FIG. 11, which is discussed below. If the path does not allow two way traffic, then control moves to the fifth control block 930, and subsequently to FIG. 10.

If, in the third decision block 924, no alternate path exists to the left of the obstacle, then the mobile machine 102, in a seventh control block 926, stops and notifies the fleet manager 202.

Referring now to FIG. 10, control proceeds from the fifth control block 930 in FIG. 9 to a first control block 1010 in FIG. 10, where the entry point 502 from the original path 104 to the alternate path 506 is determined. The flow diagram of FIG. 10 is discussed with reference to FIGS. 4–7 for purposes of clarity.

In a second control block 1012, an alternate path 506 is determined from the entry point 502 to the intermediate point 504. In a third control block 1014, the speed of the mobile machine 102 is adjusted by the control system 302 to enable the mobile machine 102 to traverse to alternate path 506. As the mobile machine 102 traverses the alternate path 506, the obstacle detection system 304, in a fourth control block 1016, scans for obstacles on the alternate path 506. The obstacle detection system 304, while scanning, is continuing to search for obstacles on the alternate path 506 that were not detected prior to the mobile machine 102 traveling on the alternate path 506. For example, the detected obstacle 402 on the original path 104 may obscure the view of part of the alternate path 506 until the mobile machine 102 travels part way around the obstacle 402.

In a first decision block 1018, if an obstacle on the alternate path is detected, then control proceeds to FIG. 11, which is discussed below. If no obstacle is detected on the alternate path, then control moves to a fifth control block 1020, where the mobile machine 102 continues to traverse the alternate path. In a sixth control block 1022, the merge point 602 from the alternate path 606 to the original path 104 is determined. The alternate path 606 is then determined in a seventh control block 1024 from the intermediate point 504 to the merge point 602.

The mobile machine 102 continues to travel around the obstacle 402 while, in an eighth control block 1026, the obstacle detection system 304 continues to scan for obstacles on the alternate path 606. If an obstacle on the alternate path 606 is detected, control proceeds to FIG. 11. If no obstacle on the alternate path is detected, control moves to a ninth control block 1030, where the mobile machine 102 returns to the original path 104 at the merge point 602, having successfully traveled around the detected obstacle 402. The mobile machine 102 then notifies the fleet manager 202 in a tenth control block 1032, providing the fleet manager 202 with the location of the obstacle 402 and the alternate path 506,606.

Referring now to FIG. 11, a flow diagram is shown which describes operation of the present invention when the path allows two way traffic.

Moving from the fourth decision block 928 in FIG. 9 to a first control block 1110 in FIG. 11, the mobile machine 102 notifies the fleet manager 202 in response to determining that the path 104 allows two way traffic. The fleet manager 202, in a second control block 1112, responsively transmits a query to the remaining mobile machines 206A–206N to determine the position, heading, and velocity of each mobile machine 206A–206N. The fleet manager 202 then calculates predicted paths for each mobile machine 206A–206N to determine if any mobile machines 206A–206N will approach the obstacle 402 at a time that would conflict with the first mobile machine 102.

Control then proceeds to a first decision block 1114. If no potential conflict exists between the first mobile machine 102 and any of the other mobile machines 206A–206N, then control proceeds to the fifth control block 930 in FIG. 9, and the mobile machine 102 plans an alternate path around the obstacle 402.

If a potential conflict exists between the mobile machine 102 and one of the other mobile machines 206A–206N, the mobile machine 102 notifies the fleet manager 202 and reduces speed, as shown in third and fourth control blocks 1116,1118. In a second decision block 1120, if the reduction of speed by the mobile machine 102 enables the mobile machine 102 to avoid a conflict with one of the other mobile machines 206A–206N, then control once again proceeds to the fifth control block 930 in FIG. 9.

If, in the second decision block 1120, it is determined that a potential conflict still exists after the mobile machine 120 has reduced speed, the mobile machine 102 stops moving until the potential conflict has cleared. Control then returns to the first control block 1110, where the process is repeated.

Referring again to FIG. 10, in the first decision block 1018, if an obstacle in the alternate path is detected, control proceeds to the third control block 1116 in FIG. 11, where the mobile machine 102 notifies the fleet manager 202 and reduces speed in the fourth control block 1118 to attempt to avoid the obstacle in the alternate path.

With reference now to FIG. 12, a flow diagram is shown which illustrates a further aspect of the present invention.

In a first control block 1210, the fleet manager 202 receives a signal from the first mobile machine 102 indicating the location of an obstacle 402 and a proposed alternate path. In a second control block 1212, the fleet manager 202 sends a signal to the remaining mobile machines 206A–206N, requesting information about the position, heading, and velocity of each mobile machine 206A–206N.

Upon receipt of the requested information from the mobile machines 206A–206N, control proceeds to a third control block 1214, where the fleet manager 202 calculates the predicted paths of each of the remaining mobile machines 206A–206N. In a fourth control block 1216, the predicted paths are analyzed to determine if any of the mobile machines 206A–206N will approach the proposed alternate path of the first mobile machine 102 during the time that the mobile machine 102 will traverse the alternate path.

In a first decision block 1218, if none of the mobile machines 206A–206N is approaching the alternate path, control moves to a fifth control block 1220. In the fifth control block 1220, the fleet manager sends a signal to the first mobile machine 102, enabling the mobile machine 102 to traverse the alternate path.

If, in the first decision block 1218, it is determined that at least one of the mobile machines 206A–206N is approaching the alternate path at the time that the first mobile machine 102 is approaching the alternate path, then control moves to a sixth control block 1222. In the sixth control block 1222, the fleet manager 202 assigns a level of priority to each mobile machine 102,206A–206N approaching the alternate path. The level of priority may be based on a number of factors. For example, a mobile machine hauling a load may be given a higher priority than an empty mobile machine returning to a load site if the fleet manager determines that the empty mobile machine will need to wait in line and the load hauling mobile machine may be able to dump the load right away. As another example, a service machine may be given higher priority than a load hauling machine if the service machine is traveling to another load hauling machine that has stalled and is blocking traffic.

After the mobile machines 102, 206A–206N have been assigned levels of priority, the mobile machine with the highest priority traverses the alternate path first, followed by mobile machines of decreasing priority.

Control from either the fifth or sixth control blocks 1220, 1222 proceeds to a seventh control block 1224, where the fleet manager 202 sends a signal to each mobile machine 102,206A–206N in the fleet indicating the location of the detected obstacle 402 and the alternate path. Responsively, each mobile machine 102, 206A–206N traverses the alternate path as part of the normal course of operations until further instructions are received.

In an eighth control block 1226, the fleet manager 20 notifies the maintenance station 208, indicating the location of the obstacle 402. The maintenance station 208 can then dispatch a maintenance crew to the site of the obstacle 402 to remove the obstacle 402. After the obstacle 402 is removed, the fleet manager 202 be notified, and can subsequently notify the mobile machines 102,206A–206N in the fleet that the original path is cleared and available.

INDUSTRIAL APPLICABILITY

In an example of an application of the present invention, a fleet of off-road mining trucks travel over roads throughout a mining site hauling loads of material and performing other tasks. The mining site is typically in a harsh environment and the roads at the mining site are constantly changing due to the changing nature of the mining areas.

Quite often, conditions arise which introduce obstacles on the mining roads. For example, rocks and boulders may roll or slide down hillsides onto the roads, materials may spill out of the trucks, and trucks may break down and block the roads.

Operators of these trucks constantly monitor the roads for obstacles and respond as needed by either stopping or driving around the obstacle. However, autonomous trucks are being developed to remove human operators from these harsh, fatiguing environments. Consequently, some means is required to monitor the roads for obstacles and respond appropriately in an autonomous manner. The present invention allows for an autonomous fleet of mining trucks to monitor for obstacles and plan alternate paths around the obstacles, if possible, while maintaining a smooth and efficient operation.

Other aspects, objects, and features of the present invention can be obtained from a study of the drawings, the disclosure, and the appended claims.

We claim:

1. A method for planning an alternate path in response to detection of an obstacle by a mobile machine at a work site, the work site including a plurality of mobile machines and a fleet manager, including the steps of:

determining the presence and location of an obstacle in a primary path of the mobile machine;

planning an alternate path around the obstacle by a path planner located on the mobile machine;

delivering a signal to the fleet manager, the signal having the location of the obstacle and the alternate path; and traversing the alternate path.

2. A method, as set forth in claim 1, including the step of scanning for obstacles as the mobile machine traverses the alternate path.

3. A method, as set forth in claim 1, wherein determining an alternate path includes the step of determining a path around one of a right side and a left side of the obstacle.

4. A method, as set forth in claim 3, wherein determining an alternate path includes the step of determining a path around the left side of the obstacle in response to no alternate path being available around the right side of the obstacle.

5. A method, as set forth in claim 4, wherein determining an alternate path includes the steps of stopping movement of the mobile machine and transmitting a signal to the fleet manager in response to no alternate path being available around the right and left sides of the obstacle.

6. A method, as set forth in claim 1, wherein the alternate path is determined as a function of the width of the mobile machine and the width of a predetermined minimum distance from the obstacle to the mobile machine.

7. A method, as set forth in claim 6, wherein the alternate path is determined from the obstacle to a second obstacle.

8. A method, as set forth in claim 7, wherein the second obstacle is one of a detected obstacle in the path and the edge of the path.

9. A method, as set forth in claim 1, wherein the obstacle has a front side and a back side, the front side being the side closest to the mobile machine as the mobile machine approaches the obstacle, the back side being the side furthest from the mobile machine as the mobile machine approaches the obstacle, and wherein the step of determining an alternate path includes the steps of:

approaching the front side of the obstacle;

determining an intermediate point at about midway around the obstacle;

planning a path to the intermediate point;

determining a point on the original path near the back side of the obstacle; and planning a path to the point on the original path.

10. A method, as set forth in claim 1, wherein the alternate path is traversed in response to receiving a signal from the fleet manager indicating that no other mobile machines are approaching the alternate path.

11. An apparatus for planning an alternate path in response to detection of an obstacle by a mobile machine at a work site, the work site including a plurality of mobile machines and a fleet manager, comprising:

an obstacle detection system located on the mobile machine;

a position determining system located on the mobile machine;

a path planner located on the mobile machine;

a communications system located on the mobile machine; and a control system located on the mobile machine adapted to receive a signal from the obstacle detection system indicating the presence of an obstacle, receive a signal from the position determining system indicating the location of the obstacle, receive a signal from the path planner indicating a proposed alternate path around the obstacle, deliver a signal to the fleet manager indicating the location of the obstacle and the alternate path, and control the mobile machine to traverse the alternate path.

12. An apparatus, as set forth in claim 11, wherein the obstacle detection system includes at least one sensor for detecting obstacles.

13. An apparatus, as set forth in claim 11, wherein the position determining system includes at least one of a satellite positioning system and an inertial positioning system.

14. A method for controlling a fleet of mobile machines as the mobile machines traverse a work site, including the steps of:

receiving a signal from a first mobile machine indicating the location of an obstacle and a proposed alternate path around the obstacle, the proposed alternate path being planned by a path planner located on the mobile machine;

determining the presence of any other mobile machine approaching the proposed alternate path; and delivering a signal to the first mobile machine to enable the mobile machine to traverse the proposed alternate path in response to determining that no other mobile machine is approaching the proposed alternate path.

15. A method, as set forth in claim 14, wherein determining the presence of any other mobile machine includes the steps of:

transmitting a signal to each mobile machine at the work site requesting position, heading, and velocity information;

predicting a path to be traversed by each mobile machine in response to receiving the requested information; and determining the presence of any mobile machine near the alternate path as a function of the predicted paths.

16. A method, as set forth in claim 15, including the step of assigning a level of priority to each mobile machine approaching the alternate path.

17. A method, as set forth in claim 16, further including the step of allowing a mobile machine with a high level of priority to traverse the alternate path prior to a mobile machine with a low level of priority.

18. A method, as set forth in claim 14, including the step of transmitting a signal having the alternate path to each mobile machine at the work site.

19. A method, as set forth in claim 14, including the step of notifying a maintenance station that an obstacle on a path has been detected.

20. A method, as set forth in claim 19, wherein notifying a maintenance station includes the step of delivering a signal having the location of the obstacle.

21. A method, as set forth in claim 19, including the step of transmitting a signal to each mobile machine at the work site in response to the obstacle being removed.

\* \* \* \* \*